US012636775B2

(12) United States Patent
Oh et al.

(10) Patent No.: US 12,636,775 B2
(45) Date of Patent: May 26, 2026

(54) ROBUST POSITION CONTROL SYSTEM OF FLEXIBLE JOINT ROBOTS

(71) Applicant: Daegu Gyeongbuk Institute of Science and Technology, Daegu (KR)

(72) Inventors: Se Hoon Oh, Daegu (KR); Deok Jin Lee, Anyang-si (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 173 days.

(21) Appl. No.: 18/464,837

(22) Filed: Sep. 11, 2023

(65) Prior Publication Data

US 2024/0001539 A1 Jan. 4, 2024

Related U.S. Application Data

(63) Continuation of application No. PCT/KR2022/002067, filed on Feb. 11, 2022.

(30) Foreign Application Priority Data

Mar. 12, 2021 (KR) ......................... 10-2021-0032516

(51) Int. Cl.
*B25J 9/00* (2006.01)
*B25J 9/04* (2006.01)
*B25J 9/16* (2006.01)

(52) U.S. Cl.
CPC ............. *B25J 9/1607* (2013.01); *B25J 9/046* (2013.01); *B25J 9/1641* (2013.01)

(58) Field of Classification Search
CPC ........ B25J 9/1607; B25J 9/046; B25J 9/1641; B25J 9/06; G05B 2219/39186; G05B 6/02; G05B 13/02
See application file for complete search history.

(56) References Cited

U.S. PATENT DOCUMENTS

| | | | | |
|---|---|---|---|---|
| 6,456,901 B1 * | 9/2002 | Xi | ........................... | B25J 9/1607 |
| | | | | 901/41 |
| 2014/0330432 A1 * | 11/2014 | Simaan | ................... | B25J 9/1625 |
| | | | | 700/250 |
| 2022/0152822 A1 * | 5/2022 | Nguyen | ................. | B25J 9/1607 |

FOREIGN PATENT DOCUMENTS

| | | | | |
|---|---|---|---|---|
| CN | 103499922 | A | * 1/2014 | |
| CN | 108882971 | A | * 11/2018 | ............ B25J 9/1697 |

(Continued)

OTHER PUBLICATIONS

S. Oh and K. Kong, "Two-Degree-of-Freedom Control of a Two-Link Manipulator in the Rotating Coordinate System," in IEEE Transactions on Industrial Electronics, vol. 62, No. 9, pp. 5598-5607, Sep. 2015 (Year: 2015).*

(Continued)

*Primary Examiner* — Ramon A. Mercado
*Assistant Examiner* — Shaheda Shabnam Hoque
(74) *Attorney, Agent, or Firm* — Sughrue Mion, PLLC

(57) ABSTRACT

A system for controlling a flexible joint robot includes a control input dimension conversion part configured to receive a control input of a robot and convert the Cartesian coordinate system of the control input to the rotating workspace coordinate system; an entire flexible joint robot dynamics part configured to receive the control input and a disturbance and output a control output by multiplying the control input reflecting the disturbance by at least one determinant; and a disturbance observer configured to reflect the estimated disturbance in the control input by calculating an estimated disturbance obtained by estimating the disturbance, wherein the disturbance observer includes a mutual reaction force removal part including a determinant for (Continued)

removing mutual reaction force between joints of the robot; a low-pass filter; and an estimated-disturbance dimension conversion part.

8 Claims, 4 Drawing Sheets

(56)                    References Cited

FOREIGN PATENT DOCUMENTS

| CN | 109202889 | A | * | 1/2019 | ............ B25J 9/1641 |
|----|-----------|---|---|--------|-------------------------|
| CN | 111538949 | A | * | 8/2020 | .............. G06F 17/11 |
| CN | 111538949 | B | * | 10/2020 | .............. G06F 17/11 |
| CN | 114750167 | A | * | 7/2022 | ............ B25J 9/1641 |
| DE | 19613407 | A1 | * | 10/1996 | ........... G11B 21/083 |
| DE | 102019131400 | A1 | * | 5/2021 | ............ B25J 9/1607 |
| EP | 1275937 | A2 | * | 1/2003 | .............. G01N 19/02 |
| EP | 2248269 | A1 | * | 11/2010 | ........... H04B 1/1027 |
| EP | 2789430 | A1 | * | 10/2014 | ............ B25J 9/0048 |
| JP | 10-309684 | A | | 11/1998 | |
| JP | H10309684 | A | * | 11/1998 | |
| JP | 2936261 | B1 | * | 8/1999 | |
| JP | 4243309 | B2 | * | 3/2009 | ............ B25J 13/084 |
| JP | 2013000816 | A | * | 1/2013 | |
| JP | 2018058181 | A | * | 4/2018 | |
| KR | 10-1487624 | B1 | | 1/2015 | |
| KR | 10-1966155 | B1 | | 4/2019 | |
| KR | 10-2017522 | B1 | | 8/2019 | |
| KR | 10-2114068 | B1 | | 5/2020 | |
| KR | 102432681 | B1 | * | 8/2022 | ............ B25J 13/088 |
| WO | WO-9720260 | A1 | * | 6/1997 | ............ G05B 19/19 |
| WO | WO-2009106130 | A1 | * | 9/2009 | ........... H04B 1/1027 |
| WO | WO-2010103399 | A1 | * | 9/2010 | ........... B25J 9/1643 |
| WO | WO-2018229540 | A1 | * | 12/2018 | ........... B25J 9/1656 |

OTHER PUBLICATIONS

International Search Report for PCT/KR2022/002067 dated Jun. 15, 2022.
Written Opinion for PCT/KR2022/002067 dated Jun. 15, 2022.
Korean Office Action for Korean Application No. 10-2021-0032516 dated Jul. 27, 2022, 5 pages.
Korean Notice of Allowance Office Action for Korean Application No. 10-2021-0032516 dated Dec. 27, 2022, 8 pages.

* cited by examiner

ROBUST POSITION CONTROL SYSTEM OF FLEXIBLE JOINT ROBOTS

CROSS-REFERENCE TO RELATED APPLICATION

This application is a National Stage Entry of PCT International Application No. PCT/KR2022/002067, which was filed on Feb. 11, 2022, and which claims priority to Korean Patent Application No. 10-2021-0032516, filed on Mar. 12, 2021 in the Korean Intellectual Property Office, the disclosure of which is incorporated herein by reference.

TECHNICAL FIELD

The present invention relates to a control system for a flexible joint robot, and more specifically, based on a nonlinear disturbance observer, it provides constant performance regardless of internal disturbance according to the robot's movement and external disturbance from the outside of the robot, and moves the robot through singularity removal.

BACKGROUND ART

As robot technology develops rapidly, the use of robots is expanding in various fields of society. A high-speed robot is required for rapid work in automated production, and a lightweight and flexible robot has been required in terms of economic efficiency.

In particular, robots with flexible joints, such as collaborative robots, rescue robots, and rehabilitation robots, have been developed a lot to enable natural interaction with environments.

A robust controller based on a disturbance observer has been used to use a flexible joint robot robustly and appropriately for the purpose, and, in the case of existing disturbance observer based on a linear system, the performance thereof varies according to robot movements, so a controller had to be conservatively designed within a limit in which stability is guaranteed. Due to such a conservative controller design, there has been a limitation in improving the performance of the robot.

In addition, when a robot is controlled in a workspace, the robot diverges at a singularity. Since existing linear disturbance observers have to be designed to avoid such a singularity, a range in which a robot can move is limited, which causes a problem in that diversity, performance, and efficiency of tasks performed by the robot are reduced.

DISCLOSURE

Technical Problem

Therefore, the present invention has been made in view of the above problems, and it is one object of the present invention to provide a nonlinear disturbance observer-based robust position control system capable of preventing a change in controller performance according to robot movements by considering a parameter change according to a change in a robot posture in a flexible joint robot It is another object of the present invention to provide a system for controlling a flexible joint robot which is capable of providing improved position control robustness and controller performance for a flexible robot by estimating and removing a reaction force between links of a robot.

It is yet another object of the present invention to provide a system for controlling a flexible joint robot which does not limit robot movements in a workspace by interpreting after converting from the Cartesian coordinate system (x-y) to the rotating workspace coordinate system ($r$–$\theta_r$) to remove the singularities of a robot.

Technical Solution

In accordance with an aspect of the present invention, the above and other objects can be accomplished by the provision of a system for controlling a flexible joint robot, including: a control input dimension conversion part configured to receive a control input of a robot and convert the Cartesian coordinate system of the control input to the rotating workspace coordinate system; an entire flexible joint robot dynamics part configured to receive the control input and a disturbance and output a control output by multiplying the control input reflecting the disturbance by at least one determinant; and a disturbance observer configured to reflect the estimated disturbance in the control input by calculating an estimated disturbance obtained by estimating the disturbance, wherein the disturbance observer includes a mutual reaction force removal part including a determinant for removing mutual reaction force between joints of the robot; a low-pass filter; and an estimated-disturbance dimension conversion part.

In addition, the robot may include a first link rotatably coupled to an installation surface in horizontal and vertical directions; and a second link rotatably coupled to the first link, wherein the first and second links are connected to each other by a flexible joint.

In addition, the control input dimension conversion part may include a Jacobian transposed matrix ($J_R{}^T$) configured to determine a relationship between a determinant for force $$\left( f_x^R, f_y^R \right)$$

acting on an end effector in a rotary coordinate system and a determinant for a torque ($\tau_m$) acting on a single joint link of a first link and a torque ($\tau_b$) acting on two joint links acting simultaneously on two links.

In addition, the Jacobian transposed matrix ($J_R{}^T$) may be $$\begin{bmatrix} l\sin\frac{q_2}{2} & l\cos\frac{q_2}{2} \\ -l\sin\frac{q_2}{2} & l\cos\frac{q_2}{2} \end{bmatrix},$$

wherein l represents each of a length of the first link and a length of the second link, and $q_2$ represents a relative angle size of the second link relative to the first link, the length of the first link being a same as the length of the second link.

In addition, a determinant by the entire flexible joint robot dynamics part may vary according to movement of the robot.

In addition, when a determinant by the entire flexible joint robot dynamics part is $\Lambda$, an inverse matrix ($\Lambda^R$) of $\Lambda$ may be calculated according to Equation 1 below:

$$\Lambda^R = \left(J_R^T\right)^{-1}\overline{M}J_R^{-1} = \frac{1}{2l^2}\begin{bmatrix} \dfrac{J_1^R}{\sin^2\dfrac{q_2}{2}} & \dfrac{J_m^R}{\sin\dfrac{q_2}{2}} \\[4mm] \dfrac{J_m^R}{\sin\dfrac{q_2}{2}} & \dfrac{J_2^R}{\cos^2\dfrac{q_2}{2}} \end{bmatrix} \qquad \text{(Equation 1)}$$

where $J_R^T$ represents a Jacobian transposition matrix representing a relationship between a force of a robot link in rotational coordinates and a robot joint torque in joint coordinates, $J_R^{-1}$ represents a Jacobian inverse matrix, $\overline{M}$ represents a nominal matrix for inertia of a robot link, $J_1^R = J_1 + m_2 l^2 + J_2 - 2m_2 d_2 l \cos q_2$, $J_2^R = J_1 + m_2 l^2 + J_2 + 2m_2 d_2 l \cos q_2$, $J_m^R = J_1 - J_2 +$ $$J_1^R = J_1 + m_2 l^2 + J_2 - 2m_2 d_2 l\cos q_2,$$

$$J_2^R = J_1 + m_2 l^2 + J_2 + 2m_2 d_2 l\cos q_2, J_m^R = J_1 - J_2 + m_2 l^2, J_1$$

represents an inertia moment for an axis passing through a center of mass of a first link, $J_2$ represents an inertia moment for an axis passing through a center of mass of a second link, $m_2$ represents the mass of the second link, $l$ represents a length of each of the links, $d_2$ represents a distance between an end of the second link and a center of gravity, and $q_2$ represents an angle of a second link in the Cartesian coordinate system.

In addition, a determinant $$\left(\Lambda_n^R\right)$$

included in the mutual reaction force removal part may set at least one matrix value in the inverse matrix $(\Lambda^R)$ to 0.

In addition, the determinant $$\left(\Lambda_n^R\right)$$

included in the mutual reaction force removal part may be calculated according to Equation 2 below:

$$\begin{bmatrix} \Lambda_{11n}^R & 0 \\ 0 & \Lambda_{22n}^R \end{bmatrix} = \frac{1}{2l^2}\begin{bmatrix} \dfrac{J_1^R}{\sin^2\dfrac{q_2}{2}} & 0 \\[4mm] 0 & \dfrac{J_2^R}{\cos^2\dfrac{q_2}{2}} \end{bmatrix} \qquad \text{(Equation 2)}$$

In addition, a determinant $$\left(\begin{bmatrix} \dot{d}_m \\ \dot{d}_b \end{bmatrix}\right)$$

for the estimated disturbance may be calculated according to Equation 3 below:

$$\begin{bmatrix} \dot{\hat{d}}_m \\ \dot{\hat{d}}_b \end{bmatrix} = -L\begin{bmatrix} \hat{d}_m \\ \hat{d}_b \end{bmatrix} + L\left(\left\{\frac{1}{N}J_R^T\Lambda_n^R J_R\begin{bmatrix} \ddot{q}_1 \\ \ddot{q}_{12} \end{bmatrix} + \begin{bmatrix} 1 & 1 \\ 0 & 1 \end{bmatrix}^{-1}\left(\begin{bmatrix} \hat{J}_{m1} & 0 \\ 0 & \hat{J}_{m2} \end{bmatrix}\begin{bmatrix} \ddot{\theta}_1 \\ \ddot{\theta}_2 \end{bmatrix} + \begin{bmatrix} \hat{B}_{ml} & 0 \\ 0 & \hat{B}_{m2} \end{bmatrix}\begin{bmatrix} \dot{\theta}_1 \\ \dot{\theta}_2 \end{bmatrix}\right)\right\} - \begin{bmatrix} \tau_m \\ \tau_b \end{bmatrix}\right) \qquad \text{(Equation 3)}$$

where $\hat{d}_m$ and $\hat{d}_b$, which are disturbances observed by a disturbance observer, respectively represents an observed disturbance value acting on a first link, which is one joint, and an observed disturbance value acting on both first and second joint links, $\dot{\hat{d}}_m$ and $\dot{\hat{d}}_b$ respectively represent changed values of $\hat{d}_m$ and $\hat{d}_b$, L represents an observation gain of a disturbance observer, N represents an actuator gear ratio, $\ddot{q}_1$ and $\ddot{q}_{12}$ respectively represent angular accelerations of links of a single joint and both joints, $\hat{J}_{m1}$ and $\hat{J}_{m2}$ respectively represent nominal inertia values of motors of first joint actuator (located at a center of rotation of the first link) and second joint actuator (located at a connection point of first and second links), $\hat{B}_{m1}$ and $\hat{B}_{m2}$ respectively represent nominal damping values of motors of actuators driving the first link and the second link, $\dot{\theta}_1$ and $\ddot{\theta}_1$ respectively represent an acceleration and angular acceleration of the actuator driving the first link, $\dot{\theta}_2$ and $\ddot{\theta}_2$ respectively represent an acceleration and angular acceleration of the actuator driving the second link, and $\tau_m$ and $\tau_b$ are respectively input torques for a single joint and both joints.

In addition, a determinant $$\left(\begin{bmatrix} \dot{\hat{d}}_m \\ \dot{\hat{d}}_b \end{bmatrix}\right)$$

for the estimated disturbance may be calculated according to Equation 4 below:

$$\begin{bmatrix} \dot{\hat{d}}_m \\ \dot{\hat{d}}_b \end{bmatrix} = -L\begin{bmatrix} \hat{d}_m \\ \hat{d}_b \end{bmatrix} + L\left(\left\{\frac{1}{4N}\right\}\begin{bmatrix} J_1^R + J_2^R & -J_1^R + J_2^R \\ -J_1^R + J_2^R & J_1^R + J_2^R \end{bmatrix}\begin{bmatrix} \ddot{q}_1 \\ \ddot{q}_2 \end{bmatrix} + \begin{bmatrix} 1 & 1 \\ 0 & 1 \end{bmatrix}^{-1}\left(\begin{bmatrix} \hat{J}_{m1} & 0 \\ 0 & \hat{J}_{m2} \end{bmatrix}\begin{bmatrix} \ddot{\theta}_1 \\ \ddot{\theta}_2 \end{bmatrix} + \begin{bmatrix} \hat{B}_{m1} & 0 \\ 0 & \hat{B}_{m2} \end{bmatrix}\begin{bmatrix} \dot{\theta}_1 \\ \dot{\theta}_2 \end{bmatrix}\right)\right) - \begin{bmatrix} \tau_m \\ \tau_b \end{bmatrix}\right) \qquad \text{(Equation 4)}$$

In accordance with another aspect of the present invention, there is provided a system for controlling a flexible joint robot, including: a control input dimension conversion part configured to receive a control input of a robot and convert the Cartesian coordinate system of the control input to the rotating workspace coordinate system; an entire flexible joint robot dynamics part configured to receive the control input and a disturbance and output a control output by multiplying the control input reflecting the disturbance by at least one determinant; and a disturbance observer configured to reflect the estimated disturbance in the control input by calculating an estimated disturbance obtained by estimating the disturbance, wherein a determinant $$\left(\begin{bmatrix} \dot{\hat{d}}_m \\ \dot{\hat{d}}_b \end{bmatrix}\right)$$

for an estimated disturbance calculated in the disturbance observer is expressed as a sum of terms including determinants $$\begin{bmatrix} \ddot{q}_1 \\ \ddot{q}_2 \end{bmatrix}, \begin{bmatrix} \dot{\theta}_1 \\ \dot{\theta}_2 \end{bmatrix}, \begin{bmatrix} \ddot{\theta}_1 \\ \ddot{\theta}_2 \end{bmatrix}, \text{ and } \begin{bmatrix} \tau_m \\ \tau_b \end{bmatrix},$$

and a denominator of a coefficient of $$\left( \begin{bmatrix} \dot{\hat{d}}_m \\ \dot{\hat{d}}_b \end{bmatrix} \right), \begin{bmatrix} \ddot{q}_1 \\ \ddot{q}_2 \end{bmatrix}, \begin{bmatrix} \ddot{\theta}_1 \\ \ddot{\theta}_2 \end{bmatrix}, \text{ or } \begin{bmatrix} \tau_m \\ \tau_b \end{bmatrix}$$

does not include 0, $\hat{d}_m$ and $\hat{d}_b$, which are disturbances observed by a disturbance observer, respectively represents an observed disturbance value acting on a first link, which is one joint, and an observed disturbance value acting on both first and second joint links, $\dot{\hat{d}}_m$ and $\dot{\hat{d}}_b$ respectively represent changed values of $\hat{d}_m$ and $\hat{d}_b$, $\ddot{q}_1$ and $\ddot{q}_{12}$ respectively represent angular accelerations of links of a single joint and both joints, $\dot{\theta}_1$ and $\ddot{\theta}_1$ respectively represent an acceleration and angular acceleration of an actuator driving the first link, $\dot{\theta}_2$ and $\ddot{\theta}_2$ respectively represent an acceleration and angular acceleration of the actuator driving the second link, and $\tau_m$ and $\tau_b$ are respectively input torques for a single joint and both joints.

A determinant $$\left( \begin{bmatrix} \dot{\hat{d}}_m \\ \dot{\hat{d}}_b \end{bmatrix} \right)$$

for the estimated disturbance may be calculated according to Equation 5 below:

$$\begin{bmatrix} \dot{\hat{d}}_m \\ \dot{\hat{d}}_b \end{bmatrix} = -L \begin{bmatrix} \hat{d}_m \\ \hat{d}_b \end{bmatrix} + \left( \left\{ \frac{1}{4N} \right\} \begin{bmatrix} J_1^R + J_2^R & -J_1^R + J_2^R \\ -J_1^R + J_2^R & J_1^R + J_2^R \end{bmatrix} \begin{bmatrix} \ddot{q}_1 \\ \ddot{q}_2 \end{bmatrix} + \right.$$
$$\left. \begin{bmatrix} 1 & 1 \\ 0 & 1 \end{bmatrix}^{-1} \left( \left[ \begin{bmatrix} \hat{J}_{m1} & 0 \\ 0 & \hat{J}_{m2} \end{bmatrix} \begin{bmatrix} \ddot{\theta}_1 \\ \ddot{\theta}_2 \end{bmatrix} + \begin{bmatrix} \hat{B}_{m1} & 0 \\ 0 & \hat{B}_{m2} \end{bmatrix} \begin{bmatrix} \dot{\theta}_1 \\ \dot{\theta}_2 \end{bmatrix} \right] - \begin{bmatrix} \tau_m \\ \tau_b \end{bmatrix} \right) \right) \quad \text{(Equation 5)}$$

where L represents an observation gain of a disturbance observer, N represents an actuator gear ratio, $\ddot{q}_1$ and $\ddot{q}_{12}$ respectively represent angular accelerations of links of a single joint and both joints, $\hat{J}_{m1}$ and $\hat{J}_{m2}$ respectively represent nominal inertia values of motors of first joint actuator (located at a center of rotation of the first link) and second joint actuator (located at a connection point of first and second links), and $\hat{B}_{m1}$ and $\hat{B}_{m2}$ respectively represent nominal damping values of motors of actuators driving the first link and the second link.

Advantageous Effects

In accordance with the present invention having the above configuration, first, the restriction on the working radius of a robot is removed due to the elimination of singularity, so various tasks can be performed without restrictions in various fields such as a robot for disaster relief, a robot for collaboration, and a robot for rehabilitation.

Second, a robot to which the present invention is applied can maximize driving efficiency near singularity in the case of many tasks, and by utilizing this effect, the present invention can achieve high efficiency in performing tasks of a robot.

Third, a system for controlling a flexible joint robot according to the present invention can achieve high performance and stability at the same time, unlike existing conservative controllers, because its performance is constant regardless of the posture of a robot.

BEST MODE

Hereinafter, the present invention will be described in detail by explaining a preferred embodiment of the invention with reference to the attached drawings. However, it should be understood that the spirit and scope of the present disclosure are not limited to the embodiment and can be modified by addition, modification, or deletion of elements constituting the embodiment and such additions, modifications, and deletions are also within the spirit and scope of the present disclosure.

Figure 1:
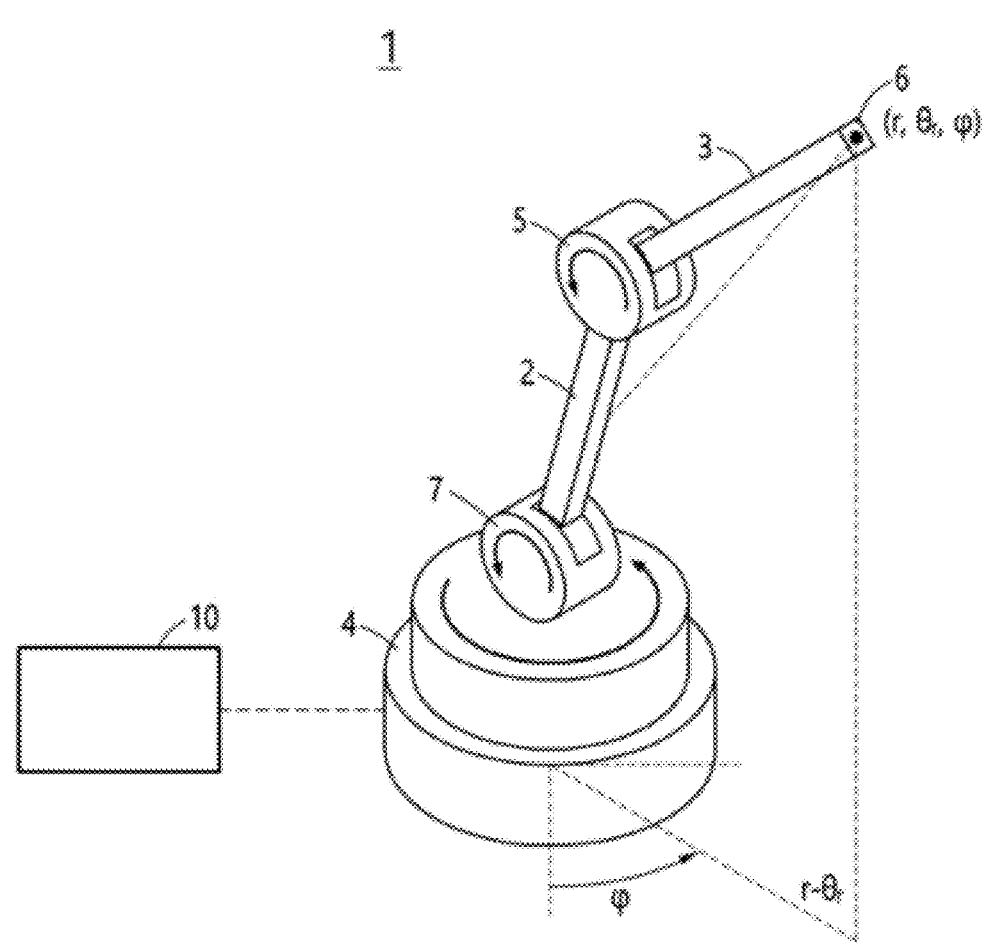
FIG. 1 is a diagram schematically illustrating a flexible joint robot to which a control system according to an embodiment of the present invention is applied.
Figure 2:
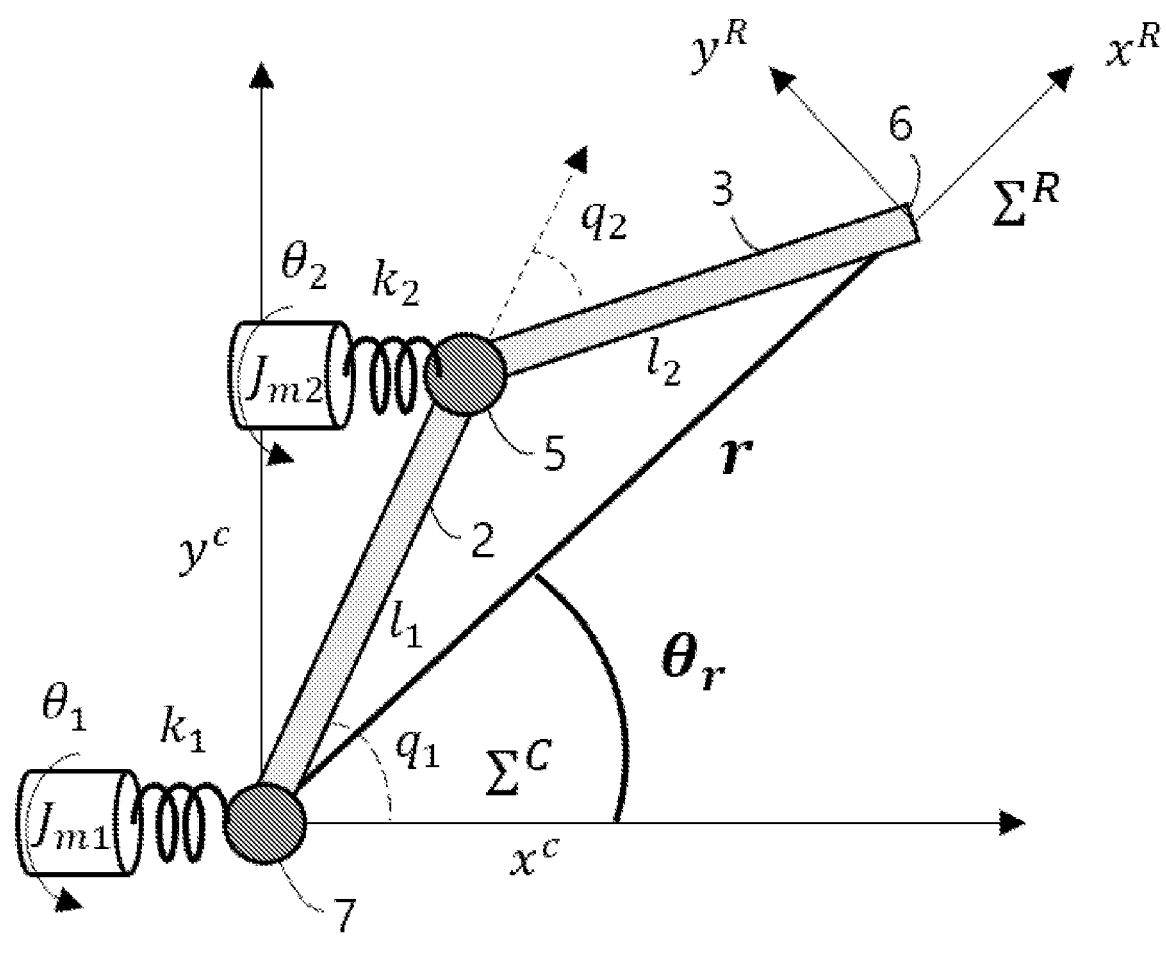
FIG. 2 illustrates, with regard to the Cartesian coordinate system and the rotating workspace coordinate system of a flexible joint robot to which a control system according to an embodiment of the present invention is applied, a structure of the flexible joint robot and a structure wherein a motor of the flexible joint robot is connected to a spring to constitute a flexible joint.

FIG. 1 is a diagram schematically illustrating a flexible joint robot to which a control system according to an embodiment of the present invention is applied, and with regard to the Cartesian coordinate system and the rotating workspace coordinate system of a flexible joint robot to which a control system according to an embodiment of the present invention is applied, FIG. 2 illustrates a structure of the flexible joint robot and a structure wherein a motor of the flexible joint robot is connected to a spring to constitute a flexible joint.

Referring to FIGS. 1 and 2, a flexible joint robot 1 to which the control system according to an embodiment of the present invention is applied may include a first link 2, a second link 3 and a control system 10. One end of the first link 2 may be rotatably installed in horizontal and vertical directions on an installation surface 4 of a robot 1 and the other end of the first link 2 may be rotatably coupled with the second link 3.

The first link 2 and the second link 3 may be rotatably connected to each other by a flexible joint 5, and the first link 2 and the installation surface 4 may be rotatably connected to each other by a flexible joint 7.

One end of the second link 3 may be rotatably coupled to the first link 2, and an end effector 6, which can directly act on a work target, may be formed at the other end of the second link 3.

In FIG. 2, the length of the first link 2 and the length of the second link 3 are respectively defined as $l_1$ and $l_2$, $q_1$ represents an angle of the first link 2 in the Cartesian coordinate system, i.e., the Cartesian coordinate system, and $q_2$ represents a relative angle size of the second link 3 relative to the first link 2.

$\theta_r$, which is an angle between the rotating workspace coordinate system and the Cartesian coordinate system, represents an angular displacement of the end effector 6 from the Cartesian coordinate system.

When a position of the end effector 6 in the Cartesian coordinate system is (x, y), a rotational workspace of the end effector 6 is defined as the rotating workspace coordinate system according to the following equation using r and $\theta_r$:

$$r = \sqrt{x^2 + y^2}$$

$$\theta_r = \arctan(x, y) \qquad \text{<Equation 1>}$$

As the position of the end effector 6 at a reference position is defined as the rotating workspace coordinate system as described above, the problem of singularity may be solved. This will be described below. A motion of the end effector 6 may be defined by a velocity, which is a derivative of a position of the end effector 6 with respect to time, and a formula for this is as follows:

$$\dot{x}^R = \dot{r}$$

$$\dot{y}^r = r\dot{\theta}_r \qquad \text{<Equation 2>}$$

In more detail, a relationship between a position of the end effector 6 and an angle of the two links 2 and 3 in a rotary coordinate system may be expressed by the following equation:

$$r = \sqrt{l_1^2 + l_2^2 + 2l_1 l_2 \cos q_2} \qquad \text{<Equation 3>}$$

$$\theta_r = \arctan\left(\frac{l_1 \cos q_1 + l_2 \cos(q_1 + q_2)}{l_1 \sin q_1 + l_2 \sin(q_1 + q_2)}\right)$$

Here, assuming that a length ($l_1$) of the first link 2 and a length ($l_2$) of the second link 3 are identically l, the following formula may be obtained:

$$r = 2l \cos\frac{q_2}{2} = 2l \cos\frac{1}{2}(q_{12} - q_1) \qquad \text{<Equation 4>}$$

$$\theta_r = q_1 + \frac{1}{2}q_2 = \frac{1}{2}(q_1 + q_{12})$$

where $q_{12}$ represents $q_1 + q_2$, i.e., an absolute angle of the second link.

Meanwhile, a relationship between a point where the flexible joint robot 1 is installed, i.e., an origin point in the Cartesian coordinate system, and the end effector 6 may be defined by the Jacobian matrix. The Jacobian matrix is as follows:

$$J = \begin{bmatrix} -l_1 \sin q_1 - l_2 \sin(q_1 + q_2) & -l_2 \sin(q_1 + q_2) \\ l_1 \cos q_1 + l_2 \cos(q_1 + q_2) & l_2 \cos(q_1 + q_2) \end{bmatrix} \qquad \text{<Equation 5>}$$

The Jacobian matrix may be separated as follows:

$$J = \begin{bmatrix} -\sin q_1 & -\sin(q_1 + q_2) \\ \cos q_1 & \cos(q_1 + q_2) \end{bmatrix} \begin{bmatrix} l_1 & 0 \\ 0 & l_2 \end{bmatrix} \begin{bmatrix} 1 & 0 \\ 1 & 1 \end{bmatrix} \qquad \text{<Equation 6>}$$

In the case of $$\begin{bmatrix} 1 & 0 \\ 1 & 1 \end{bmatrix}$$

among the determinant, a relative angular velocity may be converted to an absolute angular velocity. An equation thereof is as follows:

$$\begin{bmatrix} 1 & 0 \\ 1 & 1 \end{bmatrix}\begin{bmatrix} \dot{q}_1 \\ \dot{q}_2 \end{bmatrix} = \begin{bmatrix} \dot{q}_1 \\ \dot{q}_1 + \dot{q}_2 \end{bmatrix} = \begin{bmatrix} \dot{q}_1 \\ \dot{q}_{12} \end{bmatrix} \qquad \text{<Equation 7>}$$

A speed of the end effector 6 in the Cartesian coordinate system may be converted to a speed in the rotating workspace coordinate system. A related equation is as follows:

$$\begin{bmatrix} \dot{x}^R \\ \dot{y}^R \end{bmatrix} = \begin{bmatrix} \cos\theta_r & \sin\theta_r \\ -\sin\theta_r & \cos\theta_r \end{bmatrix}\begin{bmatrix} \dot{x} \\ \dot{y} \end{bmatrix} \qquad \text{<Equation 8>}$$

Here, according to the geometric structure of FIG. 2, $\theta_r$ may be $$q_1 + \frac{q_2}{2},$$

and, assuming that $l_1 = l_2 = l$, the following equation may be derived:

$$\begin{bmatrix} \dot{x}^R \\ \dot{y}^R \end{bmatrix} = \begin{bmatrix} \cos\theta_r & \sin\theta_r \\ -\sin\theta_r & \cos\theta_r \end{bmatrix}\begin{bmatrix} -l\sin q_1 & -l\sin q_{12} \\ l\cos q_1 & l\cos q_{12} \end{bmatrix}\begin{bmatrix} \dot{q}_1 \\ \dot{q}_{12} \end{bmatrix} \qquad \text{<Equation 9>}$$

$$= \begin{bmatrix} l\sin\frac{q_2}{2} & -l\sin\frac{q_2}{2} \\ l\cos\frac{q_2}{2} & l\cos\frac{q_2}{2} \end{bmatrix}\begin{bmatrix} \dot{q}_1 \\ \dot{q}_{12} \end{bmatrix} = J_R\begin{bmatrix} \dot{q}_1 \\ \dot{q}_{12} \end{bmatrix}$$

As can be seen in the above equation, a relationship between absolute angular velocities ($\dot{q}_1$ and $\dot{q}_{12}$) of the first link 2 and the second link 3 and speeds ($\dot{x}^R$ and $\dot{y}^R$) of the end effector 6 in the rotating workspace coordinate system may be defined a new Jacobian matrix $J_R$.

Meanwhile, forces ($f_x$, $f_y$) at the end effector 6 defined in the Cartesian coordinate system may be converted to forces $$\left(f_x^R, f_y^R\right)$$

of the end effector 6 in the rotating workspace coordinate system according to the following equation:

$$\begin{bmatrix} f_x^R \\ f_y^R \end{bmatrix} = \begin{bmatrix} \cos\theta_r & \sin\theta_r \\ -\sin\theta_r & \cos\theta_r \end{bmatrix}\begin{bmatrix} f_x \\ f_y \end{bmatrix} \qquad \text{<Equation 10>}$$

In addition, a torque ($\tau_1$) acting on the first link 2, a torque ($\tau_2$) acting on the second link 3, a torque ($\tau_m$) acting on a single joint link as only in the first link 2, and a torque ($\tau_b$) acting on two joint links which simultaneously act on two links may be defined by the following determinant. By the following determinant, the torques ($\tau_1$ and $\tau_2$) may be replaced with $\tau_m$ and $\tau_b$ such that they can be analyzed in the rotary coordinate system:

$$\begin{bmatrix} \tau_1 \\ \tau_2 \end{bmatrix} = \begin{bmatrix} 1 & 1 \\ 0 & 1 \end{bmatrix} \begin{bmatrix} \tau_m \\ \tau_b \end{bmatrix} = \begin{bmatrix} \tau_m + \tau_b \\ \tau_b \end{bmatrix} \qquad \text{<Equation 11>}$$

Assuming that $l_1 = l_2 = l$, a relationship between an output force ($f_x$, $f_y$) and an input torque ($\tau_m$ and $\tau_b$) in the end effector 6 may be defined according to the following equation:

$$\begin{bmatrix} \tau_m \\ \tau_b \end{bmatrix} = \begin{bmatrix} -l\sin q_1 & l\cos q_1 \\ -l\sin q_{12} & l\cos q_{12} \end{bmatrix} \begin{bmatrix} \cos\theta_r & -\sin\theta_r \\ \sin\theta_r & \cos\theta_r \end{bmatrix} \begin{bmatrix} f_x^R \\ f_y^R \end{bmatrix} \quad \text{<Equation 12>}$$

$$= \begin{bmatrix} l\sin\dfrac{q_2}{2} & l\cos\dfrac{q_2}{2} \\ -l\sin\dfrac{q_2}{2} & l\cos\dfrac{q_2}{2} \end{bmatrix} \begin{bmatrix} f_x^R \\ f_y^R \end{bmatrix} = J_R^T \begin{bmatrix} f_x^R \\ f_y^R \end{bmatrix}$$

Meanwhile, the control system 10 of the flexible joint robot 1 may derive an acceleration ($\ddot{x}^R$, $\ddot{y}^R$) of the end effector 6 in the rotating workspace coordinate system as a control output by using the force ($f_x$, $f_y$) at the end effector 6 defined in the Cartesian coordinate system as a control input and by controlling the control input by a flexible joint robot dynamics equation, etc.

In this process, the control system 10 may control the flexible joint robot 1 by estimating external or internal disturbances (d_1, d_2) and subtracting them from the control input. This control system 10 is described in more detail below.

Figure 3:
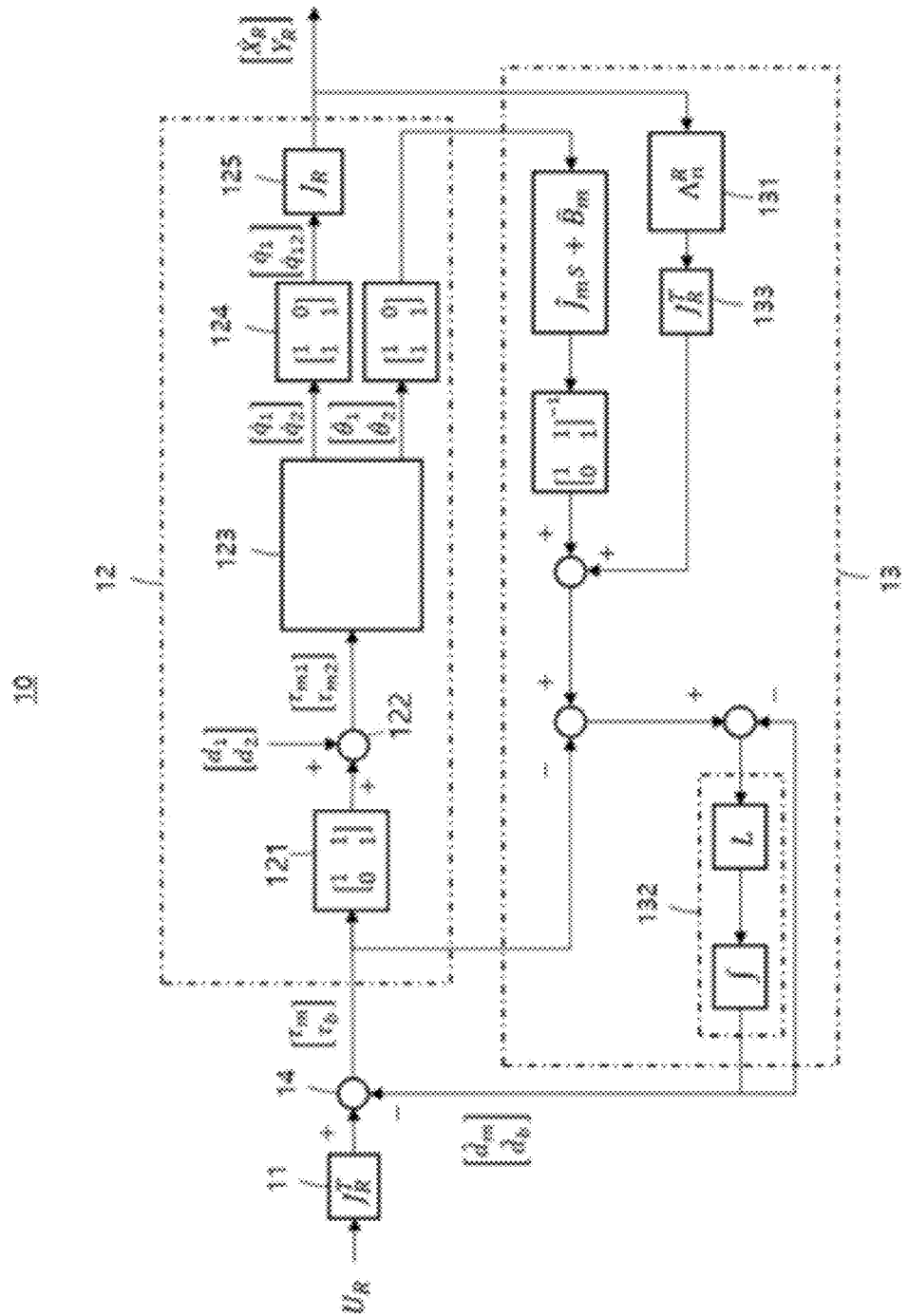
FIG. 3 is a block diagram schematically illustrating a system for controlling a flexible joint robot according to an embodiment of the present invention.
Figure 4:
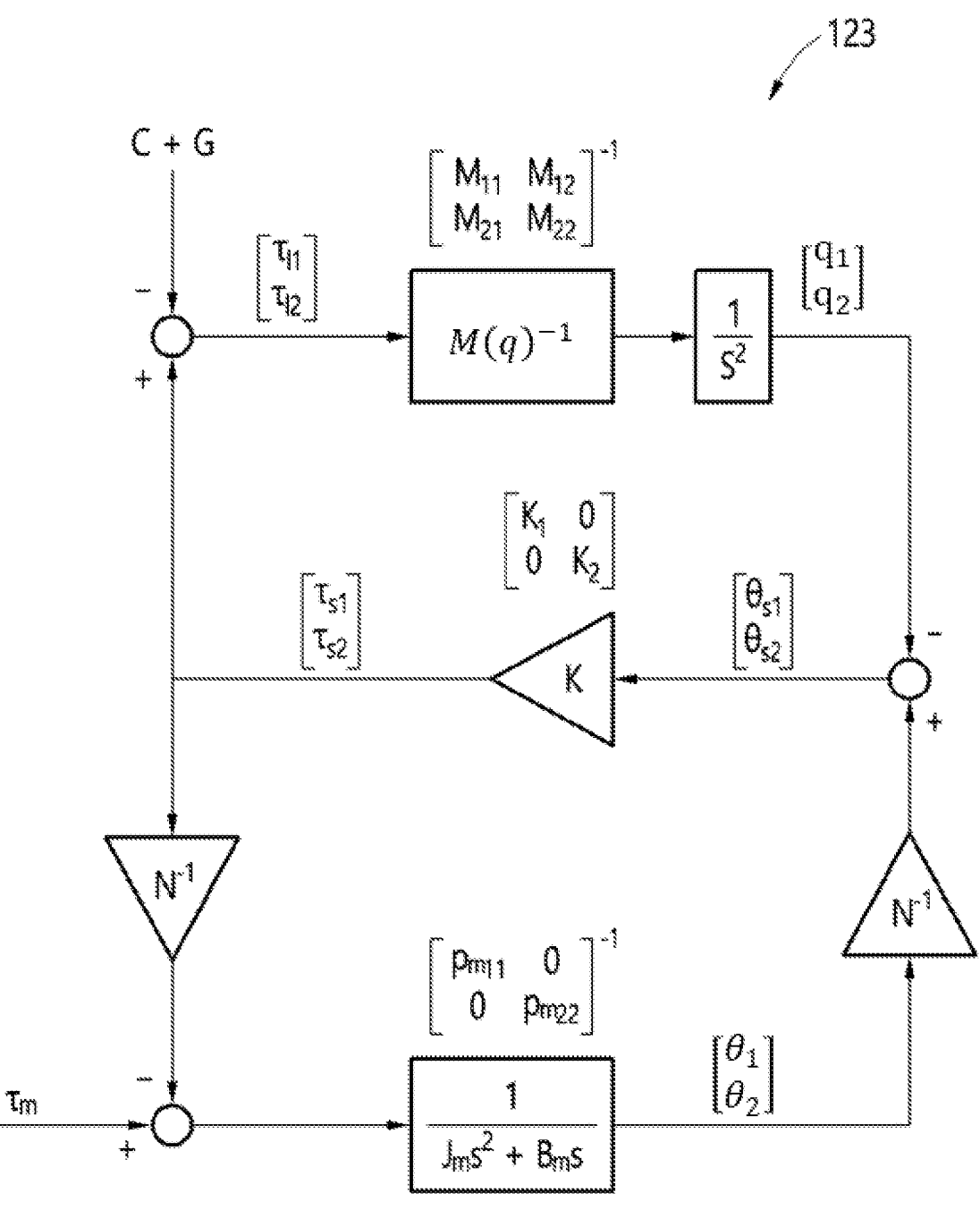
FIG. 4 is a block diagram schematically illustrating an internal flexible joint robot dynamics part included in a system for controlling a flexible joint robot according to an embodiment of the present invention.

FIG. 3 is a block diagram schematically illustrating a system for controlling a flexible joint robot according to an embodiment of the present invention, and FIG. 4 is a block diagram schematically illustrating an internal flexible joint robot dynamics part included in a system for controlling a flexible joint robot according to an embodiment of the present invention.

The control system 10 of the flexible joint robot 1 according to an embodiment of the present invention may include a control input dimension conversion part 11, an entire flexible joint robot dynamics part 12, a disturbance observer 13, and an estimated-disturbance reflection part 14.

The control input dimension conversion part 11 may receive a control input and convert a control input of the Cartesian coordinate system into the rotating workspace coordinate system. The control input may be force ($f_x$, $f_y$) at the end effector 6, and the control input dimension conversion part 11 may converted to a determinant $$\left( \begin{bmatrix} \tau_m \\ \tau_b \end{bmatrix} \right)$$

for $\tau_m$ and $\tau_b$ such that the control input can be interpreted in the rotary coordinate system by the above determinant containing Equations 10 and 12.

Accordingly, the control input dimension conversion part 11 may include a transposed matrix ($J_R^T$) of the Jacobian matrix which determines a relationship between a determinant for the force $$\left( f_x^R, f_y^R \right)$$

acting on the end effector 6 in the rotary coordinate system and a determinant for the torque ($\tau_m$) acting on a single joint link of the first link 2 and the torque ($\tau_b$) acting on two joint links acting simultaneously on two links.

The entire flexible joint robot dynamics part 12 may include a first matrix conversion part 121, a disturbance input part 122, an internal flexible joint robot dynamics part 123, a second matrix conversion part 124, and a dimension conversion part 125.

The first matrix conversion part 121 multiplies a converted determinant $$\left( \begin{bmatrix} \tau_m \\ \tau_b \end{bmatrix} \right)$$

by a determinant $$\begin{bmatrix} 1 & 1 \\ 0 & 1 \end{bmatrix}$$

to convert to a determinant $$\begin{bmatrix} \tau_1 \\ \tau_2 \end{bmatrix}.$$

The converted $$\begin{bmatrix} \tau_1 \\ \tau_2 \end{bmatrix}$$

is added with a disturbance $$\left( \begin{bmatrix} d_1 \\ d_2 \end{bmatrix} \right)$$

introduced from the disturbance input part 122 to form $$\begin{bmatrix} \tau_{m1} \\ \tau_{m2} \end{bmatrix},$$

and the $$\begin{bmatrix} \tau_{m1} \\ \tau_{m2} \end{bmatrix}$$

is calculated by the following flexible joint robot dynamics equation in the internal flexible joint robot dynamics part 123:

$$\text{Robot: } M(q)\ddot{q} = K\left( \dfrac{\theta}{N} - q \right) + d_1 \qquad \text{<Equation 13>}$$

$$\text{Flexible actuator: } J_m\ddot{\theta} + B_m\dot{\theta} = \tau_m + d_2 - \dfrac{K\left( \dfrac{\theta}{N} - 1 \right)}{N}$$

where M(q) represents an inertia matrix value of the robot link, q and $\ddot{q}$ respectively represent an angle and angular acceleration of the robot joint, $\theta$, $\dot{\theta}$ and $\ddot{\theta}$ respectively represent an angle, angular speed and angular acceleration of the actuator, $J_m$ and $B_m$ respectively represent an inertial value and damping value of an actuator motor, $\tau$ represents an actuator-applied value, K represents a stiffness value of the flexible joint, and N represents an actuator gear ratio.

The determinant calculated by the internal flexible joint robot dynamics part 123 is multiplied by a determinant $$\begin{bmatrix} 1 & 0 \\ 1 & 1 \end{bmatrix}$$

by the second matrix conversion part 124 to derive a determinant $$\begin{bmatrix} \ddot{q}_1 \\ \ddot{q}_{12} \end{bmatrix},$$

and the derived $$\begin{bmatrix} \ddot{q}_1 \\ \ddot{q}_{12} \end{bmatrix}$$

is calculated with the Jacobian matrix $J_R$ of <Equation 9> by the dimension conversion part 125 to derive a determinant $$\begin{bmatrix} \ddot{x}^R \\ \ddot{y}^R \end{bmatrix}$$

for the acceleration $(\ddot{x}^R, \ddot{y}^R)$ of the end effector 6 in the rotary coordinate system which is a control output.

When a determinant obtained by all of the determinants of the first matrix conversion part 121 of the entire flexible joint robot dynamics part 12, the internal flexible joint robot dynamics part 123, and the second matrix conversion part 124 is $\Lambda$, an inverse matrix ($\Lambda^R$) of $\Lambda$ is obtained according to the following equation:

$$\Lambda^R = \left(J_R^T\right)^{-1}\overline{M}J_R^{-1} = \frac{1}{2l^2}\begin{bmatrix} \dfrac{J_1^R}{\sin^2\frac{q_2}{2}} & \dfrac{J_m^R}{\sin\frac{q_2}{2}} \\ \dfrac{J_m^R}{\sin\frac{q_2}{2}} & \dfrac{J_2^R}{\cos^2\frac{q_2}{2}} \end{bmatrix} \quad \text{<Equation 14>}$$

where $J_R{}^T$ represents the Jacobian transposition matrix representing a relationship between a force of a robot link in rotational coordinates and a robot joint torque in joint coordinates, $J_R{}^{-1}$ represents the Jacobian inverse matrix, $\overline{M}$ represents a nominal matrix for inertia of a robot link, $J_1^R = J_1 + m_2l^2 + J_2 - 2m_2d_2l\cos\ q_2,$ $J_2^R = J_1 + m_2l^2 + J_2 + 2m_2d_2l\cos\ q_2, J_m^R = J_1 - J_2 + m_2l^2, J_1$ represents an inertia moment for an axis passing through a center of mass of a first link, $J_2$ represents an inertia moment for an axis passing through a center of mass of a second link, $m_2$ represents the mass of the second link, l represents a length of each of the links, $d_2$ represents a distance between an end of the second link and a center of gravity, and $q_2$ represents an angle of a second link in an orthogonal coordinate system.

In Equation 14, as the value $q_2$ is included in the component of the matrix of $$\Lambda_n^R,$$

the component value of the matrix of the determinant by the entire flexible joint robot dynamics part 12 is changed according to a motion of the flexible joint robot 1, so that changes in controller performance according to the motion of the flexible joint robot 1 may be eliminated.

The disturbance observer 13 may calculate an estimated disturbance $$\left(\begin{bmatrix} \hat{d}_m \\ \hat{d}_b \end{bmatrix}\right)$$

obtained by estimating the disturbance $$\left(\begin{bmatrix} d_1 \\ d_2 \end{bmatrix}\right)$$

induced from a disturbance inlet part 122 and may reflect the estimated disturbance to the control input through the estimated-disturbance reflection part 14.

The disturbance observer 13 may include a mutual reaction force removal part 131 including a determinant for removing mutual reaction force between joints of the flexible joint robot 1, a low-pass filter 132, an estimated-disturbance dimension conversion part 133.

The mutual reaction force removal part 131 may remove mutual reaction force between the robot joints by multiplying a determinant, obtained by replacing a component value of a diagonal matrix in the determinant of the above Equation 14 with 0, by a control output $$\begin{bmatrix} \ddot{x}^R \\ \ddot{y}^R \end{bmatrix}.$$

The determinant included in the mutual reaction force removal part 131 is as follows:

$$\Lambda_n^R = \begin{bmatrix} \Lambda_{11n}^R & 0 \\ 0 & \Lambda_{22n}^R \end{bmatrix} = \frac{1}{2l^2}\begin{bmatrix} \dfrac{J_1^R}{\sin^2\frac{q_2}{2}} & 0 \\ 0 & \dfrac{J_2^R}{\cos^2\frac{q_2}{2}} \end{bmatrix} \quad \text{<Equation 15>}$$

As the component values of 1st row, 2nd column and 2nd row, 1st column of the above Equation 15 included in the mutual reaction force removal part 131 become 0 and the component values of 1st row, 1st column and 2nd row, 2nd column are the component values of 1st row, 1st column and 2nd row, 2nd column of $\Lambda^R$, mutual reaction forces between the joints may be removed by setting other component values to 0 while increasing in proportion to some component values of the determinant included in the internal flexible joint robot dynamics part 123.

In the mutual reaction force removal part 131, the control output is multiplied by the determinant of the above Equation 15, and the remaining determinant may be disturbed and introduced into the low-pass filter 132.

A determinant for an estimated disturbance may be calculated as in the following equation by multiplying a value calculated in the low-pass filter 132 by the Jacobian transposed matrix ($J_R{}^T$) in the estimated-disturbance dimension conversion part 133:

$$\begin{bmatrix} \dot{\hat{d}}_m \\ \dot{\hat{d}}_b \end{bmatrix} = -L\begin{bmatrix} \hat{d}_m \\ \hat{d}_b \end{bmatrix} + L\left(\left\{\frac{1}{N}J_R^T\Lambda_n^R J_R\begin{bmatrix} \ddot{q}_1 \\ \ddot{q}_{12} \end{bmatrix} + \right.\right.$$ <Equation 16>

$$\left.\left.\begin{bmatrix} 1 & 1 \\ 0 & 1 \end{bmatrix}^{-1}\left(\begin{bmatrix} \hat{J}_{m1} & 0 \\ 0 & \hat{J}_{m2} \end{bmatrix}\begin{bmatrix} \ddot{\theta}_1 \\ \ddot{\theta}_2 \end{bmatrix} + \begin{bmatrix} \hat{B}_{m1} & 0 \\ 0 & \hat{B}_{m2} \end{bmatrix}\begin{bmatrix} \dot{\theta}_1 \\ \dot{\theta}_2 \end{bmatrix}\right)\right\} - \begin{bmatrix} \tau_m \\ \tau_b \end{bmatrix}\right)$$

where $\hat{d}_m$ and $\hat{d}_b$, which are disturbances observed by a disturbance observer, respectively represents an observed disturbance value acting on a first link, which is one joint, and an observed disturbance value acting on both first and second joint links, s, $\dot{\hat{d}}_m$ and $\dot{\hat{d}}_b$ respectively represent changed values of $\hat{d}_m$ and $\hat{d}_b$, L represents an observation gain of a disturbance observer, N represents an actuator gear ratio, $\ddot{q}_1$ and $\ddot{q}_{12}$ respectively represent angular accelerations of links of a single joint and both joints, $\hat{J}_{m1}$ and $\hat{J}_{m2}$ respectively represent nominal inertia values of motors of first joint actuator (located at a center of rotation of the first link) and second joint actuator (located at a connection point of first and second links), $\hat{B}_{m1}$ and $\hat{B}_{m2}$ respectively represent nominal damping values of motors of actuators driving the first link and the second link, $\dot{\theta}_1$ and $\ddot{\theta}_1$ respectively represent an acceleration and angular acceleration of the actuator driving the first link, $\dot{\theta}_2$ and $\ddot{\theta}_2$ respectively represent an acceleration and angular acceleration of the actuator driving the second link, and $\tau_m$ and $\tau_b$ are respectively input torques for a single joint and both joints.

The above Equation 16 may be expressed in the form of the following equation:

$$\begin{bmatrix} \dot{\hat{d}}_m \\ \dot{\hat{d}}_b \end{bmatrix} = -L\begin{bmatrix} \hat{d}_m \\ \hat{d}_b \end{bmatrix} + L\left(\left\{\frac{1}{4N}\right\}\begin{bmatrix} J_1^R + J_2^R & -J_1^R + J_2^R \\ -J_1^R + J_2^R & J_1^R + J_2^R \end{bmatrix}\begin{bmatrix} \ddot{q}_1 \\ \ddot{q}_2 \end{bmatrix} + \right.$$ <Equation 17>

$$\left.\begin{bmatrix} 1 & 1 \\ 0 & 1 \end{bmatrix}^{-1}\left(\begin{bmatrix} \hat{J}_{m1} & 0 \\ 0 & \hat{J}_{m2} \end{bmatrix}\begin{bmatrix} \ddot{\theta}_1 \\ \ddot{\theta}_2 \end{bmatrix} + \begin{bmatrix} \hat{B}_{m1} & 0 \\ 0 & \hat{B}_{m2} \end{bmatrix}\begin{bmatrix} \dot{\theta}_1 \\ \dot{\theta}_2 \end{bmatrix}\right) - \begin{bmatrix} \tau_m \\ \tau_b \end{bmatrix}\right)$$

In Equation 17, since $$J_1^R =$$

$$J_1 + m_2l^2 + J_2 - 2m_2d_2l\cos q_2 \text{ and } J_2^R = J_1 + m_2l^2 + J_2 + 2m_2d_2l\cos q_2$$

with regard to the determinant $$\begin{bmatrix} J_1^R + J_2^R & -J_1^R + J_2^R \\ -J_1^R + J_2^R & J_1^R + J_2^R \end{bmatrix}$$

multiplied by a front end of $$\begin{bmatrix} \ddot{q}_1 \\ \ddot{q}_{12} \end{bmatrix},$$

the possibility that a denominator of each component of the determinant becomes 0 is blocked, so there is an advantage in that singularity can be removed.

In the case of related technologies, there is a problem that an estimated disturbance value diverges when the denominator of the determinant multiplied by the front end of $$\begin{bmatrix} \ddot{q}_1 \\ \ddot{q}_{12} \end{bmatrix}$$

includes sin $q_2$ and the $q_2$ value becomes 0 or $\pi$. This problem can be addressed by the present invention.

While the present invention has been described referring to the preferred embodiments, those skilled in the art will appreciate that many modifications and changes can be made to the present invention without departing from the spirit and essential characteristics of the present invention.

The invention claimed is:

1. A flexible joint robot system comprising:

a flexible joint robot comprising a first link, a second link and a flexible joint to which each of the first link and the second link is rotatably connected; and a control system for controlling the flexible joint robot, wherein the control system comprises joint actuators configured to rotate the first and second links, sensors configured to detect joint angles and/or torques of the first and second links, and a controller including a processor and a memory storing control instructions, wherein the control system comprises:

a control input dimension conversion part configured to receive a control input of the robot and convert the Cartesian coordinate system of the control input to the rotating workspace coordinate system, an entire flexible joint robot dynamics part configured to receive the control input and a disturbance and output a control output including torque commands applied to a first joint actuator located at a center of rotation of the first link and a second joint actuator located at a connection point of the first and second links so as to control a position and/or orientation of an end effector of the flexible joint robot in the rotating workspace coordinate system by multiplying the control input reflecting the disturbance by at least one determinant, and a disturbance observer configured to reflect the estimated disturbance in the control input by calculating an estimated disturbance, wherein the disturbance observer comprises a mutual reaction force removal part comprising a determinant for removing mutual reaction force between joints of the robot, a low-pass filter, and an estimated-disturbance dimension conversion part, wherein the mutual reaction force removal part is configured to remove mutual reaction forces between the joints so that vibration and position error of the end effector caused by the interaction between the first and second links are reduced, wherein, when a determinant by the entire flexible joint robot dynamics part is $\Lambda$, an inverse matrix ($\Lambda^R$) of $\Lambda$ is calculated according to Equation 1 below:

$$\Lambda^R = (J_R^T)^{-1} \bar{M} J_R^{-1} = \frac{1}{2l^2} \begin{bmatrix} \dfrac{J_1^R}{\sin^2 \frac{q_2}{2}} & \dfrac{J_m^R}{\sin \frac{q_2}{2}} \\ \dfrac{J_m^R}{\sin \frac{q_2}{2}} & \dfrac{J_2^R}{\cos^2 \frac{q_2}{2}} \end{bmatrix} \quad \text{(Equation 1)}$$

where $J_R{}^T$ represents the Jacobian transposition matrix representing a relationship between a force of a robot link in rotational coordinates and a robot joint torque in joint coordinates, $J_R{}^{-1}$ represents the Jacobian inverse matrix, $\bar{M}$ represents a nominal matrix for inertia of a robot link, $$J_1^R = J_1 + m_2 l^2 + J_2 - 2m_2 d_2 l \cos\, q_2,$$

$$J_2^R = J_1 + m_2 l^2 + J_2 + 2m_2 d_2 l \cos\, q_2, J_m^R = J_1 - J_2 + m_2 l^2, J_1$$

represents an inertia moment for an axis passing through a center of mass of the first link, $J_2$ represents an inertia moment for an axis passing through a center of mass of the second link, $m_2$ represents the mass of the second link, $l$ represents a length of each of the first and second links, $d_2$ represents a distance between an end of the second link and a center of gravity, and $q_2$ represents an angle of the second link in the Cartesian coordinate system, wherein a determinant $$(\Lambda_n^R)$$

comprised in the mutual reaction force removal part sets at least one matrix value in the inverse matrix ($\Lambda^R$) to 0, wherein the determinant $$(\Lambda_n^R)$$

comprised in the mutual reaction force removal part is calculated according to Equation 2 below:

$$\begin{bmatrix} \Lambda_{11n}^R & 0 \\ 0 & \Lambda_{22n}^R \end{bmatrix} = \frac{1}{2l^2} \begin{bmatrix} \dfrac{J_1^R}{\sin^2 \frac{q_2}{2}} & 0 \\ 0 & \dfrac{J_2^R}{\cos^2 \frac{q_2}{2}} \end{bmatrix} \quad \text{(Equation 2)}$$

wherein a determinant $$\left( \begin{bmatrix} \dot{\hat{d}}_m \\ \dot{\hat{d}}_b \end{bmatrix} \right)$$

for the estimated disturbance is calculated according to Equation 3 below:

$$\begin{bmatrix} \dot{\hat{d}}_m \\ \dot{\hat{d}}_b \end{bmatrix} = -L \begin{bmatrix} \hat{d}_m \\ \hat{d}_b \end{bmatrix} + L \left( \left\{ \frac{1}{N} J_R^T \Lambda_n^R J_R \begin{bmatrix} \ddot{q}_1 \\ \ddot{q}_{12} \end{bmatrix} + \begin{bmatrix} 1 & 1 \\ 0 & 1 \end{bmatrix}^{-1} \left( \begin{bmatrix} \hat{J}_{m1} & 0 \\ 0 & \hat{J}_{m2} \end{bmatrix} \begin{bmatrix} \ddot{\theta}_1 \\ \ddot{\theta}_2 \end{bmatrix} + \begin{bmatrix} \hat{B}_{m1} & 0 \\ 0 & \hat{B}_{m2} \end{bmatrix} \begin{bmatrix} \dot{\theta}_1 \\ \dot{\theta}_2 \end{bmatrix} \right) \right\} - \begin{bmatrix} \tau_m \\ \tau_b \end{bmatrix} \right) \quad \text{(Equation 3)}$$

where $\hat{d}_m$ and $\hat{d}_b$, which are disturbances observed by a disturbance observer, respectively represents an observed disturbance value acting on the first link, which is one joint, and an observed disturbance value acting on both the first and second links, $\dot{\hat{d}}_m$ and $\dot{\hat{d}}_b$ respectively represent changed values of $\hat{d}_m$ and $\hat{d}_b$, L represents an observation gain of a disturbance observer, N represents an actuator gear ratio, $\ddot{q}_1$ and $\ddot{q}_{12}$ respectively represent angular accelerations of links of a single joint and both joints, $\hat{J}_{m1}$ $\hat{J}_{m2}$ respectively represent nominal inertia values of motors of first joint actuator (located at a center of rotation of the first link) and second joint actuator (located at a connection point of the first and second links), $\hat{B}_{m1}$ and $\hat{B}_{m2}$ respectively represent nominal damping values of motors of actuators driving the first link and the second link, $\dot{\theta}_1$ and $\ddot{\theta}_1$ respectively represent an acceleration and angular acceleration of the actuator driving the first link, $\dot{\theta}_2$ and $\ddot{\theta}_2$ respectively represent an acceleration and angular acceleration of the actuator driving the second link, and $\tau_m$ and $\tau_b$ are respectively input torques for a single joint and both joints.

2. The system according to claim 1, wherein the first link is rotatably coupled to an installation surface in horizontal and vertical directions, and the second link is rotatably coupled to the first link, wherein the first and second links are connected to each other by the flexible joint.

3. The system according to claim 2, wherein the control input dimension conversion part comprises the Jacobian transposed matrix ($J_R{}^T$) configured to determine a relationship between a determinant for force $$(f_x^R, f_y^R)$$

acting on an end effector in the rotating workspace coordinate system and a determinant for a torque ($\tau_m$) acting on a single joint link of the first link and a torque ($\tau_b$) acting on two joint links acting simultaneously on the first and second links.

4. The system according to claim 3, wherein the Jacobian transposed matrix ($J_R{}^T$) is $$\begin{bmatrix} l\sin\frac{q_2}{2} & l\cos\frac{q_2}{2} \\ -l\sin\frac{q_2}{2} & l\cos\frac{q_2}{2} \end{bmatrix},$$

wherein l represents a length of the first link and a length of the second link, and $q_2$ represents a relative angle size of the second link relative to the first link, the length of the first link being a same as the length of the second link.

5. The system according to claim 1, wherein a determinant by the entire flexible joint robot dynamics part varies according to movement of the robot.

6. The system according to claim 1, wherein a determinant $$\left(\begin{bmatrix} \dot{\hat{d}}_m \\ \dot{\hat{d}}_b \end{bmatrix}\right)$$

for the estimated disturbance is calculated according to Equation 4 below:

$$\begin{bmatrix} \dot{\hat{d}}_m \\ \dot{\hat{d}}_b \end{bmatrix} = -L\begin{bmatrix} \hat{d}_m \\ \hat{d}_b \end{bmatrix} + L\left(\left\{\frac{1}{4N}\right\}\begin{bmatrix} J_1^R + J_2^R & -J_1^R + J_2^R \\ -J_1^R + J_2^R & J_1^R + J_2^R \end{bmatrix}\begin{bmatrix} \ddot{q}_1 \\ \ddot{q}_2 \end{bmatrix} + \right. \tag{Equation 4}$$

$$\left. \begin{bmatrix} 1 & 1 \\ 0 & 1 \end{bmatrix}^{-1}\left(\begin{bmatrix} \hat{J}_{m1} & 0 \\ 0 & \hat{J}_{m2} \end{bmatrix}\begin{bmatrix} \ddot{\theta}_1 \\ \ddot{\theta}_2 \end{bmatrix} + \begin{bmatrix} \hat{B}_{m1} & 0 \\ 0 & \hat{B}_{m2} \end{bmatrix}\begin{bmatrix} \dot{\theta}_1 \\ \dot{\theta}_2 \end{bmatrix}\right) - \begin{bmatrix} \tau_m \\ \tau_b \end{bmatrix}\right)$$

7. A flexible joint robot system comprising:
a flexible joint robot comprising a first link, a second link and a flexible joint to which each of the first link and the second link is rotatably connected; and
a control system for controlling the flexible joint robot,
wherein the control system comprises joint actuators configured to rotate the first and second links, sensors configured to detect joint angles and/or torques of the first and second links, and a controller including a processor and a memory storing control instructions,
wherein the control system comprises:
a control input dimension conversion part configured to receive a control input of the robot and convert the Cartesian coordinate system of the control input to the rotating workspace coordinate system,
an entire flexible joint robot dynamics part configured to receive the control input and a disturbance and output a control output including torque commands applied to a first joint actuator located at a center of rotation of the first link and a second joint actuator located at a connection point of the first and second links so as to control a position and/or orientation of an end effector of the flexible joint robot in the rotating workspace coordinate system by multiplying the control input reflecting the disturbance by at least one determinant, and
a disturbance observer configured to reflect the estimated disturbance in the control input by calculating an estimated disturbance,
wherein a determinant $$\left(\begin{bmatrix} \dot{\hat{d}}_m \\ \dot{\hat{d}}_b \end{bmatrix}\right)$$

for an estimated disturbance calculated in the disturbance observer is expressed as a sum of terms comprising determinants $$\begin{bmatrix} \ddot{q}_1 \\ \ddot{q}_2 \end{bmatrix}, \begin{bmatrix} \ddot{\theta}_1 \\ \ddot{\theta}_2 \end{bmatrix}, \begin{bmatrix} \dot{\theta}_1 \\ \dot{\theta}_2 \end{bmatrix}, \text{ and } \begin{bmatrix} \tau_m \\ \tau_b \end{bmatrix},$$

and a denominator of a coefficient of $$\begin{bmatrix} \dot{\hat{d}}_m \\ \dot{\hat{d}}_b \end{bmatrix}, \begin{bmatrix} \ddot{q}_1 \\ \ddot{q}_2 \end{bmatrix}, \begin{bmatrix} \ddot{\theta}_1 \\ \ddot{\theta}_2 \end{bmatrix}, \text{ or } \begin{bmatrix} \tau_m \\ \tau_b \end{bmatrix}$$

does not comprise 0,
$\hat{d}_m$ and $\hat{d}_b$, which are disturbances observed by a disturbance observer, respectively represents an observed disturbance value acting on the first link, which is one joint, and an observed disturbance value acting on both first and second joint links, $\dot{\hat{d}}_m$ and $\dot{\hat{d}}_b$ respectively represent changed values of $\hat{d}_m$ and $\hat{d}_b$, $\ddot{q}_1$ and $\ddot{q}_2$ respectively represent angular accelerations of links of a single joint and both joints, $\dot{\theta}_1$ and $\ddot{\theta}_1$ respectively represent an acceleration and angular acceleration of an actuator driving the first link, $\dot{\theta}_2$ and $\ddot{\theta}_2$ respectively represent an acceleration and angular acceleration of the actuator driving the second link, and $\tau_m$ and $\tau_b$ are respectively input torques for a single joint and both joints.

8. The system according to claim 7, wherein a determinant $$\left(\begin{bmatrix} \dot{\hat{d}}_m \\ \dot{\hat{d}}_b \end{bmatrix}\right)$$

for the estimated disturbance is calculated according to Equation 5 below:

$$\begin{bmatrix} \dot{\hat{d}}_m \\ \dot{\hat{d}}_b \end{bmatrix} = -L\begin{bmatrix} \hat{d}_m \\ \hat{d}_b \end{bmatrix} + L\left(\left\{\frac{1}{4N}\right\}\begin{bmatrix} J_1^R + J_2^R & -J_1^R + J_2^R \\ -J_1^R + J_2^R & J_1^R + J_2^R \end{bmatrix}\begin{bmatrix} \ddot{q}_1 \\ \ddot{q}_2 \end{bmatrix} + \right. \tag{Equation 5}$$

$$\left. \begin{bmatrix} 1 & 1 \\ 0 & 1 \end{bmatrix}^{-1}\left(\begin{bmatrix} \hat{J}_{m1} & 0 \\ 0 & \hat{J}_{m2} \end{bmatrix}\begin{bmatrix} \ddot{\theta}_1 \\ \ddot{\theta}_2 \end{bmatrix} + \begin{bmatrix} \hat{B}_{m1} & 0 \\ 0 & \hat{B}_{m2} \end{bmatrix}\begin{bmatrix} \dot{\theta}_1 \\ \dot{\theta}_2 \end{bmatrix}\right) - \begin{bmatrix} \tau_m \\ \tau_b \end{bmatrix}\right)$$

where L represents an observation gain of a disturbance observer, N represents an actuator gear ratio, $\ddot{q}_1$ and $\ddot{q}_2$ respectively represent angular accelerations of links of a single joint and both joints, $\hat{J}_{m1}$ and $\hat{J}_{m2}$ respectively represent nominal inertia values of motors of first joint actuator (located at a center of rotation of the first link) and second joint actuator (located at a connection point of the first and second links), and $\hat{B}_{m1}$ and $\hat{B}_{m2}$ respectively represent nominal damping values of motors of actuators driving the first link and the second link.

* * * * *